(12) United States Patent
Mochizuki et al.

(10) Patent No.: US 6,756,422 B1
(45) Date of Patent: Jun. 29, 2004

(54) MEMBER USED FOR PHOTOGRAPHIC SENSITIVE MATERIAL

(75) Inventors: Tadashi Mochizuki, Kanagawa (JP); Naoyoshi Chino, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/959,751

(22) PCT Filed: May 9, 2000

(86) PCT No.: PCT/JP00/02955
§ 371 (c)(1),
(2), (4) Date: Nov. 5, 2001

(87) PCT Pub. No.: WO00/68737
PCT Pub. Date: Nov. 16, 2000

(30) Foreign Application Priority Data

May 10, 1999 (JP) ............................................ 11-128440

(51) Int. Cl.⁷ ........................... C08K 5/00; C08K 11/00
(52) U.S. Cl. ...................... 523/122; 523/124; 523/128
(58) Field of Search ................................ 523/122, 124, 523/128

(56) References Cited

U.S. PATENT DOCUMENTS

| | | |
|---|---|---|
| 3,909,468 A | 9/1975 | Tanaka et al. |
| 5,240,754 A * | 8/1993 | Akao et al. ............... 428/36.92 |

FOREIGN PATENT DOCUMENTS

| | | | |
|---|---|---|---|
| DE | 2362985 | 6/1974 | |
| EP | 554939 | 8/1993 | |
| EP | 0 717 079 A2 | 6/1996 | |
| GB | 2273458 | 2/1994 | |
| JP | 49-131236 | 12/1974 | |
| JP | 50-62243 | 5/1975 | |
| JP | 5-70696 | 3/1993 | |
| JP | 6-172624 | 6/1994 | |
| JP | 6-266054 | 9/1994 | ............ G03C/3/00 |
| JP | 95/08417 | 3/1995 | |
| JP | 7-319127 | 12/1995 | |
| JP | 8-158158 | 6/1996 | |
| JP | 9-80693 | 3/1997 | ............ G03C/3/00 |
| JP | 2731972 | 12/1997 | ............ G03C/3/00 |
| JP | 10-28881 | 2/1998 | ............ B02B/3/04 |
| JP | 10-288810 A | 10/1998 | |
| JP | 11-38558 | 2/1999 | ............ G03C/3/00 |
| JP | 11-116785 | 4/1999 | |

* cited by examiner

Primary Examiner—Kriellion A. Sanders
(74) Attorney, Agent, or Firm—Sughrue Mion, PLLC (57) ABSTRACT

A member used for a photographic sensitive material that is formed from a degradable polymer having a water absorption of 8% or less and a flexural modulus of 1,000 kg/cm² or more. The member exhibits satisfactory performance as a formed member used for a photographic sensitive material, has no adverse effects on a photographic sensitive material, does not hurt an incinerator upon incineration for scrapping it, and, in the nature, is decomposed or decreased in strength by microbes, light or heat and hence is free from the danger of causing environmental problems.

6 Claims, 1 Drawing Sheet

FIG.1

MEMBER USED FOR PHOTOGRAPHIC SENSITIVE MATERIAL

TECHNICAL FIELD

The present invention relates to a member used for photographic sensitive material. More particularly, the present invention relates to a member used for a photographic sensitive material that has satisfactory performance for use as an injection molding member used for a photographic sensitive material, gives no adverse effects on a photographic sensitive material, does not hurt an incinerator for scrapping it, and in the natural world, is decomposed or reduced in strength by microbes, light or heat and hence is free of the danger of causing environmental problems.

BACKGROUND ART

Heretofore, a member used for a photographic sensitive material, for example, a container used for an instant film (of a mono-sheet type or a peel apart type) (for example, INSTAX Mini, ACE etc., trade names), a plastic cartridge, APS cartridge, a light shielded container used for packing in illuminated room, a film unit with a lens (a wrapping member used for "UTSURUNNDESU", trade name), spools, plastic cases (P cases) and so forth are injection molded from various synthetic polymers such as polyethylene resins, polypropylene resins, polystyrene resins and so forth in order to secure physical strength and also secure moisture-proof property and light shielding properties.

Further, a container used for a photographic sensitive material, a kind of the member used for a photographic sensitive material, particularly a cap of container used for a photographic sensitive material has capabilities of engaging with the body of a container, preventing the permeation of moisture, and maintaining a long shelf life as a part of the functions. Conventionally, a cap of container used for a photographic sensitive material has been produced from synthetic polymers such as low density polyethylene resins as a main material so that they can give no adverse effects on the photographic sensitive material and secure physical strength and moisture-proof property and light shielding properties.

These synthetic polymers are very excellent materials from the viewpoints of stability against light, heat, various chemicals and microbes, giving no adverse effects on the quality of photographic sensitive materials and maintaining the quality of photographic sensitive materials for a long time.

In recent years, rapid popularization of instant films and an increase in use amount of photographic sensitive materials has led to an increased demand for an injection molded member used for a photographic sensitive material having no or less adverse effects on the environment. In particular, a film with a lens (for example, "Utsurundesu," trade name) is increasingly recovered, reused and recycled. However, 100% recovery is difficult in the case where it is used, for example, overseas.

Further, a cap of container used for a photographic sensitive material has been disposed of mainly by incineration or land reclamation although it has been sometimes recovered and reused after use. However, recently, an increasing attention has been paid to the issue of environmental protection and accordingly it has been demanded that a container used for a photographic sensitive material must give no or less adverse effects on the environment.

However, a member used for a photographic sensitive material made of a conventional synthetic polymer such as polyethylene, low density polyethylene, polystyrene, or polypropylene produces a lot of heat upon burning, so that their incineration in large amounts gives adverse effects on the durability of the incinerator. On the other hand, in the case where it is disposed of by land reclamation, it is stable not only to light, heat, and various chemicals but also to microbes and hence they will not be decomposed and putrefied, thus causing environmental problems.

JP 2731972B proposed the use of synthetic resin compositions that have biodegradability and/or photodegradability and generate no substance harmful to photographic sensitive materials as a wrapping material used for a photographic sensitive material. The degradable polymers disclosed in the publication contain an ester group, an alcohol group, an ether group, an amide group, a urethane bond, an imido bond and so forth. Because the polymers contain a large amount of oxygen in the molecule, they have lower combustion caloric than that of synthetic polymers such as polyethylene, polystyrene and polypropylene.

However, since the degradable polymers themselves disclosed in the publication have the above-described molecule structure, they have higher water absorption rate than that of low-density polyethylene; therefore, they can readily permeate moisture. Further, when a photographic sensitive material is contained in a member that has absorbed water, the member supplies water to the photographic sensitive material so that it is feared that the function of moisture-proofing property required for a member used for a photographic sensitive material will not be achieved.

It is known that moisture will deteriorate the performance of a photographic sensitive material. Therefore, a member used for a photographic sensitive material, for example, the body of a container used for a photographic sensitive material is made of high density polyethylene, and a case used for an instant film and a body of case used for a film with a lens are made of polystyrene, respectively. The water absorption rate of these materials are on the order of about 0.01% and at most on the order of 0.1% so that they are materials very difficult to absorb water. On the other hand, the degradable polymers mostly are highly water absorbing and it has not been elucidated yet as to what a degree of water absorption rate the material should have in order for it to be applied to a member used for a photographic sensitive material.

Furthermore, the container member used for an instant film, a film unit with a lens and so forth contain a film in a synthetic resin-made case, which is further wrapped with a moisture preventing bag. As a result, the case is wrapped in a state where the resin per se constituting the case has absorbed water. Accordingly, when the wrapping bag is left to stand at high temperatures, the humidity inside it increases so that there is the possibility that adverse effects will be posed on the photographic sensitive material contained therein. This problem, which is not encountered with in the case of a conventional member made of a resin having low water absorption, such as polyethylene, is associated with the use of a degradable polymer.

DISCLOSURE OF THE INVENTION

Accordingly, a primary object of the present invention is to provide a member used for a photographic sensitive material that exhibits necessary performance required for a member used for a photographic sensitive material and that does not hurt an incinerator upon incineration for scrapping it and is decomposed or reduced in strength by microbes, light or heat and hence is free from the danger of causing environmental problems.

Further, a secondary object of the present invention is to provide a member used for a photographic sensitive material, in particular a cap of a container used for a photographic sensitive material that similarly to the above does not hurt an incinerator upon incineration for scrapping it and is free of the danger of causing environmental problems and that gives no adverse effects on the photographic sensitive material in respect of engagement strength and moisture-proof property and achieves necessary performance.

To achieve the primary object above, the present invention provides a member used for a photographic sensitive material molded from a degradable polymer having a water absorption of 6% or less and a flexural modulus of 1,000 kgf/cm$^2$ or more. Use of a degradable polymer having a flexural modulus of 8,000 kgf/cm$^2$ or more is particularly preferable.

Further, to achieve the secondary object above, the present invention provides a container used for a photographic sensitive material, in particular a cap of a container used for a photographic sensitive material, molded from a degradable polymer having a water absorption of 6% or less and a flexural modulus of 1,000 to 6,000 kgf/cm$^2$.

BRIEF DESCRIPTION OF THE DRAWINGS

1 Cap of a container used for a photographic sensitive material
2 Recess
3 Gate portion
4 Body of a container

BEST MODE FOR CARRYING OUT THE INVENTION

In the present invention, the term "member used for a photographic sensitive material" means a member that houses a photographic sensitive material therein and has necessary moisture-proof property and optionally light shielding property as necessary as well as physical strength and dimension precision in order to achieve the function of preserving the quality and performance of the photographic sensitive material for a long time. For example, such a member includes a container used for photographic material (including a cap of a container used for a photographic sensitive material), a member used for an instant film container (INSTAX mini, ACE etc., trade names), a plastic cartridge, an APS cartridge, a light shielded container for packing in illuminated room, a film unit with a lens (wrapping member used for "UTSURUNDESU", trade name), a spool, a plastic case (P case), a core for winding therearound a photosensitive material for printing, a magazine used for a photosensitive material and so forth.

Hereinafter, the member used for a photographic sensitive material (hereinafter referred to as "inventive member") will be explained in detail.

The inventive member comprises a degradable polymer as a main component. The degradable polymer is a polymer that has the property of being decomposed by microbes, light or heat when it is discarded into the natural world and includes biodegradable polymers, light/heat degradable polymers and those polymers having both biodegradability and light/heat degradability concurrently.

The term "biodegradable polymer" means a polymer that after use is decomposed to a low molecular weight compound or compounds by the action of microbes existing in the nature and finally decomposed to inorganic substances such as water and carbon dioxide. The biodegradable polymer is a resin that shows a degree of biodegradability of 60% or more according to the method prescribed by ISO 14851, ISO 14852, ISO 14855 or the like. For example, in the growth tests of microbes according to ASTM G21-70, comparative experiments using polystyrene resins and polyethylene resins show degrees of growth of microbes of levels 1 and 2. In contrast, the biodegradable polymer shows higher levels of degree of growth such as level 3 or level 4. Further, the biodegradable polymer is a polymer that shows positive results on the degree of easy biodegradation by the modified MITI Tests (I) of OECD Test Guideline 301C and shows further positive results on the intrinsic biodegradability by the modified MITI test (II) of OECD Test Guideline 301C.

The biodegradable polymers are roughly divided into the following groups.

(1) Microbe-produced Polymer (a) Polyhydroxybutyrate/valerate (for example, BIOPOL, manufactured by Monsanto),
(b) Poly-β-hydroxybutyric acid (for example, BIOGREEN, manufactured by Mitsubishi Gas Chemical Company, Inc.)

(2) Synthetic Polymer (a) Polyvinyl alcohol (PVA) (for example, POVAL, manufactured by Kuraray Co., Ltd.)
(b) Polylactic acid (for example, LACTY, manufactured by Shimadzu Corporation; LACIA, manufactured by Mitsui Chemical Inc.; ECOPLAY, manufactured by Cargyl Dow)
(c) Polyalkyl succinate
(d) Polycaprolactone (PCL) (for example, CELL GREEN P-H, manufactured by Daicel Chemical Industries, Ltd.)
(e) Polyester carbonate
(f) Polyamino acid (for example, ε-polylysine, γ-polyglutamic acid, poly-γ-methyl-L-glutamate, etc.)
(g) Polyester amide (3) Natural Substance Based Polymer (a) Cellulose acetate (for example, CELL GREEN P-CA, manufactured by Daicel Chemical Industries, Ltd.)
(b) Starch+PCL (for example, Mater-Bi, manufactured by Nippon Synthetic Chemicals Industry Co., Ltd.; NOVON, manufactured by Chisso Corporation)
(c) Modified starch powder (for example, EVERCORN, manufactured by Japan Cornstarch Co., Ltd.)
(d) Chitosan (for example, DOLON, manufactured by Aisero Kagaku)

(4) Others (Polysaccharides)

Bacteriocellulose
Dextran
Pullulan
Kardoran
Xanthan gum
Duran gum

The light/heat degradable polymer includes the following ones:

(a) Starch powder+catalyst: a polymer having compounded therein starch whose surface was treated with a silane coupling agent, unsaturated fatty acid, and organic metal (for example, DEGRA NOVON, manufactured by Novon Japan Co., Ltd.)
(b) Copolymer of a vinyl ketone compound with polyethylene, polypropylene or polystyrene
(c) Ethylene/CO/VAC ternary copolymer
(d) Copolymer of ethylene and carbon monoxide In the present invention, the degradable polymer may be the above-mentioned biodegradable polymer or light/heat degradable polymer used alone or a combination of the degradable polymer and light/heat degradable polymer. These polymers may be used alone or one or more of them may be used in combination.

Further, in the present invention, a combination of a degradable polymer and a non-degradable polymer to provide necessary degradability may be used. The degradable polymer that can be used in the present invention may also include, for example, those obtained by adding a microbe-degradable plasticizer such as a straight chain aliphatic hydrocarbon (for example, straight chain aliphatic hydrocarbon having 8 to 32 carbon atoms), or an aliphatic polyester (for example, polycaprolactone, polyglycolic acid, polyuric acid, or derivatives thereof such as esters thereof) to a non-degradable polymer or a mixture of a non-degradable polymer with a degradable polymer to impart degradability.

Furthermore, a stimulant for microbial degradation may be used. The stimulant for microbial degradation includes master batches obtained by blending cornstarch, potato starch, rice starch, or modified starches derived therefrom, in polymers in high concentrations.

It is known that generally a photographic sensitive material will have decreased performance due to temperature and moisture. For this reason, the film is protected in a packaging container having a moisture-proof function. Thus, the container must have a water absorption of 5 mg or less after 24 hours' retention of it under the conditions where 4 g of calcium chloride, which is water absorbing, is introduced in the body of a container used for a photographic film cartridge and left to stand at a temperature of 40° C. and at a humidity of 90%. To meet with this requirement, the degradable polymer used as a main material of the inventive member has a water absorption of 6% or less, preferably 1% or less from the viewpoint of retaining airtightness of the container used for a photographic sensitive material and maintaining the quality of the photographic sensitive material. This feature is important particularly for the cap of a container. In the present invention, the water absorption is measured according to the A method prescribed in JIS-K7209.

Further, the degradable polymer used in the present invention has a flexural modulus of 1,000 kgf/cm$^2$ or more. The flexural modulus is selected from proper ranges depending on various functions (for example, rigidity in the case of a container), or characteristics and so forth required for a member used for a photographic sensitive material. In particular, for the cap of a container used for a photographic sensitive material, the degradable polymer having a flexural modulus in the range of between 1,000 and 6,000 kgf/cm$^2$ is used in order to obtain the required engagement strength and easiness to open. One having a flexural modulus in the range of between 2,000 and 4,500 kgf/cm$^2$ is particularly preferred from the viewpoints of engagement strength and of easiness to open. If the flexural modulus is outside the range of between 1,000 and 6,000 kgf/cm$^2$, the engagement strength is outside the range of between 0.5 and 2.5 kg at ambient temperature (20 to 25° C.). If the engagement strength of the cap with the container is less than 0.5 kg, the cap will come out of engagement with the container when the container is dropped. On the other hand, if the engagement strength of the cap with the container is greater than 2.5 kg, the cap will be difficult to open at low temperatures. In the case of the body of a container used for a photographic film cartridge, a degradable polymer having a flexural modulus of 6,000 kgf/cm$^2$ or more is used in order to obtain engagement strength with the cap of a container used for the photographic film cartridge and easiness to open the cap of the photographic film cartridge container. In the case where deformation is concerned about depending on the shape of the member, the degradable polymer having a flexural modulus of 8,000 kgf/cm$^2$ or more is preferable and that having a flexural modulus in the range of 9,500 to 42,000 kgf/cm$^2$ is particularly preferable. If the flexural modulus is outside the range of between 8,000 and 42,000 kgf/cm$^2$, the engagement strength with the cap of the container is outside the range of between 0.5 and 2.5 kg at ambient temperature (20 to 25° C.). If the engagement strength with the cap of the container is less than 0.5 kg, the cap will come out of engagement with the container when the container is dropped. On the other hand, if the engagement strength is greater than 2.5 kg, the cap will be very difficult to open at low temperatures. When molding a spool used for a photographic film from a molding material having a flexural modulus of 8,000 kgf/cm$^2$ or less, a rib formed at a predetermined position of the spool in order to hold the photographic film at a stopper prong is deformed by the photographic film to be loaded. As a result, there is the fear that troubles may occur such that it is impossible to load the film or wind it along its whole length or if the winding is possible, the wound film is not taken out again.

Further, the degradable polymer used in the present invention desirably has a notched Izod impact strength at 23° C. of 0.8 kg.cm/cm or more. If the notched Izod impact strength at 23° C. of the degradable polymer is less than 0.8 kg.cm/cm, breaking or cracking tends to occur more often due to falling of products or shock during processing or wrapping process or in the course of transportation of products so that the airtightness or function of the container cannot be secured and a decrease in the quality of photographic sensitive materials is feared.

It is desirable that the degradable polymer used in the present invention has a Vicat softening point of 50° C. or more. If the Vicat softening point is less than 50° C., the inventive member might be vulnerable to thermal deformation to fail to achieve its function of providing airtightness and moisture proof property when it is left on the bonnet or seat of an automobile that is directly exposed to sunlight in summer seasons or when it is used in the severest environment in the world such as in tropical countries and deserts.

The degradable polymer used in the present invention may optionally contain various additives such as a colorant, an antistatic agent, an antioxidant, a lubricant, an ultraviolet absorbent, a crystal nucleating agent, a reinforcement, a filler and so forth as far as they do not deteriorate the advantageous effects of the present invention.

The colorant that can be used includes the followings.
Carbon blacks (gas furnace black, oil furnace black, channel black, anthracene black, acetylene black, Ketchen carbon black, electroconductive carbon black, thermal black, lamp black, oil smoke black, animal black, vegetable black etc.)

Oxides: silica, diatomaceous earth, alumina, titanium oxide, iron oxide, zinc oxide, magnesium oxide, antimony oxide, barium ferrite, strontium ferrite, beryllium oxide, pumice stone, pumice stone balloon, alumina fiber, etc.

Hydroxides: aluminum hydroxide, magnesium hydroxide, basic magnesium carbonate, etc.

Carbonates: calcium carbonate, magnesium carbonate, dolomite, dawsonite, etc.

Sulfuric (sulfurous) acid salts: calcium sulfate, barium sulfate, ammonium sulfate, calcium sulfite, etc.

Silicates: talc, clay, mica, asbestos, glass fiber, glass balloon, glass bead, calcium silicate, montmorillonite, bentonite, etc.

Carbon: graphite, carbon fiber, carbon hollow spheres, etc.

Others: iron powder, copper powder, lead powder, tin powder, stainless steel powder, pearlescent pigment, aluminum powder, molybdenum sulfide, boron fiber, silicon carbide fiber, brass fiber, calcium titanate, lead titanate zirconate, zinc borate, barium metaborate, calcium borate, sodium borate, aluminum paste, etc.

Organic Compounds:

Wood meal (pine, oak, sawdust, etc.), husk fiber (almond, peanut, rice hull, etc.), cotton, jute, paper strips, cellophane pieces, nylon fiber, polypropylene fiber, starch, aromatic polyamide fiber, pulverized paper, cotton linter, etc.

Among these colorants, carbon black, titanium oxide, light reflecting aluminum powder, and aluminum paste are preferred since they are excellent in heat resistance and light resistance and are relatively inactive substances.

The addition amount of the colorant is preferably 0.1 to 1% by weight.

The colorants are selected depending on the color needed or the purpose of light shielding. For example, in the case of a container or a cap of a container used for housing a photographic sensitive material that particularly requires light shielding property, such as a high-speed film, a special-purpose film (e.g., X-ray film), it is desirable to use a colorant having excellent light shielding property such as carbon black, titanium oxide, or the like.

Further, in the case where discrimination is to be effected by coloring containers depending on the brand, grade or the like of the photographic sensitive materials to be housed therein, corresponding colors may be optionally selected.

When the colorant is added to the member used for a photographic sensitive material, it is added in an amount of preferably 0.1 to 10% by weight.

The antistatic agents are roughly grouped into an internal antistatic agent and an external antistatic agent.

Specific examples of the internal antistatic agent includes nonionic antistatic agents such as higher alcohol ethylene oxide adducts, alkylphenol ethylene oxide adducts, esters (for example, esters of higher fatty acids and polyhydric alcohols, polyethylene glycol esters of higher fatty acids, and so forth), polyethers, and amides (for example, higher fatty acid amides, dialkylamides, higher fatty acid amide ethylene oxide adducts, and so forth).

Examples of internal anionic antistatic agent includes alkylarylsulfonic acids, adipic acid, glutamic acid, alkylsulfonic acid salts, alkyl sulfate, polyoxyethylene alkyl phosphate, fatty acid salts, alkylbenzenesulfonic acid salts, alkylnaphthalenesulfonic acid salts, and sodium dialkylsulfone succinate.

Examples of internal cationic antistatic agent includes amines (for example, alkylamine phosphates, Schiff's salts, amide amines, polyethyleneimines, complexes of amide amines and metal salts, alkyl ester of amino acids, and so forth), imidazolines, amine ethylene oxide adducts, quaternary ammonium salts, and so forth.

Examples of internal amphoteric antistatic agent includes N-acylsarcosinates, aminocarboxylic acid derivatives, alanine type metal salts, imidazoline type metal salts, carboxylic acid type metal salts, dicarboxylic acid type metal salts, diamine type metal salts, metal salts having an ethylene oxide group, and so forth.

Further, the internal antistatic agent includes inorganic electrolytes, metal powders, metal oxides, kaolin, silicic acid salts, carbon powder, carbon fiber, and so forth.

External antistatic agent includes nonionic antistatic agents such as polyhydric alcohols (for example, glycerine, sorbite, polyethylene glycol, polyethylene oxide, etc.), polyhydric alcohol esters, higher alcohol ethylene oxide adducts, alkylphenol ethylene oxide adducts, amides, amide ethylene oxide adducts, and so forth. Further, external amphoteric antistatic agent includes carboxylic acids (for example, alkylalanine, etc.), sulfonic acids, and so forth.

External anionic antistatic agent includes carboxylic acids, sulfuric acid derivatives (for example, alkylsulfonic acid salts, etc.), phosphoric acid derivatives (for example, phosphonic acid, phosphoric acid esters, etc.), polyester derivatives, and so forth.

External cationic antistatic agent includes amines (for example, alkylamines, amide amines, ester amines, etc.), vinyl-nitrogen derivatives, quaternary ammonium salts (for example, ammonium salts containing amide groups, ammonium salts containing ethylene oxide, etc.), acrylic acid ester derivatives, acrylic acid amide derivatives, vinyl ether derivatives, and so forth.

These antistatic agents are added in a ratio of preferably 0.01 to 5.0% by weight.

The antioxidant includes the following substances.

Phenol based antioxidants:

n-octadecyl-3-(3',5'-di-t-butyl-4'-hydroxyphenyl)propionate
2,6-di-t-butyl-4-methylphenol
2,2'-methylenebis(4-methyl-6-t-butylphenol)
4,4'-thiobis(3-methyl-6-t-butylphenol)
4,4'-butylidenebis(3-methyl-6-t-butylphenol)
stearyl-β-(3-5-di-4-butyl-4-hydroxyphenyl)propionate
1,1,3-tris(2-methyl-4-hydroxy-5-t-butylphenyl)butane
1,3,5-trimethyl-2,4,6-tris(3,5-di-t-butyl-4-hydroxybenzyl) benzene
tetrakis[methylene-3-(3',5'-di-t-butyl-4'-hydroxyphenyl) propionate]methane, and so forth.

Sulfur based antioxidants:

dilauryl 3,3'-thiodipropionate
dimyristyl-3,3'-thiodipropionate
lauryl stearyl thiodipropionate
distearyl-3,3'-thiodipropionate
ditridecyl-3,3'-thiodipropionate, and so forth Phosphorus based antioxidants:

trinonyl phenyl phosphite
triphenyl phosphite
tris(2,4-di-t-butylphenyl)phosphite
distearyl pentaerythritol diphosphite, and so forth.

These antioxidants are added in a proportion of preferably 0.005 to 2% by weight in order for them to be effective for continuous molding at high efficiencies.

To shorten the molding cycle and prevent the scraping of molded articles during processing process or transportation, the use of lubricants is effective. The lubricants that can be used in the present invention include the following substances.

Silicone based lubricants:
dimethylpolysiloxane, carboxyl-modified silicone oil (commercially available from Shin-Etsu Silicone Co., Ltd., Toray Silicone Co., Ltd., etc.) Oleic acid amide based lubricants:
ARMO SLIP-CP (trade name, manufactured by Lion Akzo Co., Ltd.), NEWTRON (trade name, manufactured by Nippon Seika), NEWTRON E-18 (trade name, manufactured by Nippon Seika Kogyo), AMIDE-O (trade name, manufactured by Nitto Chemical Industry Co., Ltd.), ALFLOW E-10 (trade name, manufactured by Nippon Oil and Fats Co., Ltd.), DIAMID O-200 (trade name, manufactured by Nippon Kasei Chemical Co., Ltd.), etc.

Erucic acid amide lubricants:
ALFLOW P-10 (trade name, manufactured by Nippon Kasei Chemical Co., Ltd.), NEWTRON S (trade name, manufactured by Nippon Seika), etc.

Stearic acid amide lubricants:
ALFLOW S-10 (trade name, manufactured by Nippon Oil and Fats Co., Ltd.), NEWTRON 2 (trade name, manufactured by Nippon Seika Kogyo), and DIAMID 200 (trade name, manufactured by Nippon Kasei), etc.

Bis fatty acid amide lubricants:
BISAMIDE (trade name, manufactured by Nippon Kasei), DIAMID 200 BIS (trade name, manufactured by Nippon Kasei), and ARMO WAX-EBS (trade name, manufactured by Lion Akzo Co., Ltd.), etc.

Alkylamine based lubricants:
ELECTROSTRIPPER TS-2 (trade names, manufactured by Kao Corporation), etc.

Hydrocarbon lubricants:
Liquid paraffin, natural paraffin, micro wax, synthetic paraffin, polyethylene wax, polypropylene wax, chlorinated hydrocarbon, and fluorocarbon.

Fatty acid lubricants:
Higher fatty acids (whose preferable number of carbon atoms is $C_{12}$ or more), and oxy fatty acid.

Ester lubricants:
Lower alcohol esters of fatty acids, polyvalent alcohol esters of fatty acids, polyglycol esters of fatty acids, and fatty alcohol esters of fatty acids.

Alcohol lubricants:
Polyvalent alcohol, polyglycol, and polyglycerol.

Metallic soaps:
Compounds of higher fatty acids, such as lauric acid, stearic acid, ricinoleic acid, naphthenic acid and oleic acid, and metals, such as Li, Mg, Ca, Sr, Ba, Zn, Cd, Al, Sn, and Pb.

Among these lubricants, oleic acid amide lubricants is preferred when it is in use for preparing a cap of a container used for a photographic sensitive material.

The lubricant is added in an amount in the range of preferably 0.005 to 2% by weight.

As the ultraviolet absorbent, benzophenone based, benzotriazole based, salicylate based, oxazolic acid based, Ni based, hindered amine based ones are preferred.

Crystal nucleating agents are roughly classified into an organic nucleating agent and an inorganic nucleating agent.

The organic nucleating agent includes di-(p-methylbenzylidene)sorbitol, di-(2,4-dimethylbenzylidene)sorbitol, di-(2,4-diethylbenzylidene)sorbitol, di-(1,3,5-trimethylbenzylidene)sorbitol, di-(pentamethylbenzylidene)sorbitol, 1,3,2,4-di(methylbenzylidene)sorbitol, 1,3-p-ethylbenzylidene-2,4-p-methylbenzylidene sorbitol, 1,3-p-methylbenzylidene-2,4-p-ethylbenzylidene sorbitol, 1,3-p-methylbenzylidene-2,4-p-chlorobenzylidene sorbitol, 1,3-p-chlorobenzylidene-2,4-p-methylbenzylidene sorbitol, 1,3-p-methylbenzylidene-2,4-p-isopropylbenzylidene sorbitol, 1,3-p-isopropylbenzylidene-2,4-p-methylbenzylidene sorbitol, 1,3-p-ethylbenzylidene-2,4-p-isopropylbenzylidene sorbitol, 1,3-p-chlorobenzylidene-2, 4-p-isopropylbenzylidene sorbitol, 1,3,2,4-di-(ethylbenzylidene)sorbitol, 1,3,2,4-di-(propylbenzylidene)sorbitol, 1, 3,2, 4-di-(methoxybenzylidene)sorbitol, 1,3,2,4-di-(ethoxybenzylidene)sorbitol, 1,3,2,4-di-(p-methylbenzylidene)sorbitol, 1,3,2,4-di-(p-chlorobenzylidene)sorbitol, 1,3,2,4-di-(p-methoxybenzylidene)sorbitol, 1,3,2,4-di-(alkylbenzylidene) sorbitol, and so forth. In particular, dibenzylidene sorbitol compounds are preferred.

The inorganic nucleating agents includes alkali metal hydroxides such as lithium hydroxide, sodium hydroxide, and potassium hydroxide, alkali metal oxides such as sodium oxide, alkali metal carbonates such as lithium carbonate, sodium carbonate, potassium carbonate, sodium hydrogen carbonate, and potassium hydrogen carbonate, alkaline earth metal hydroxides such as calcium hydroxide, magnesium hydroxide, and barium hydroxide, alkaline earth metal oxides such as calcium carbonate and calcium oxide, and so forth.

Among these nucleating agents, organic nucleating agents, in particular dibenzylidene sorbitol compounds, are preferable because they can improve transparency, physical strength and rigidity of the member used for a photographic sensitive material.

In the present invention, when a nucleating agent is used, its addition amount is in the range of preferably 0.01 to 1.0% by weight.

Further, in order to increase the heat resistance, rigidity and drop impact strength and to decrease the degree of shrinkage and the change in dimension due to water absorption, the following reinforcements or fillers may be added in the range where the advantageous effects of the present invention are not deteriorated:

Amorphous filler: ground limestone, precipitated calcium carbonate, natural silica, synthetic silica, kaolin, clay, titanium oxide, barium sulfate, zinc oxide, aluminum hydroxide, alumina, and magnesium hydroxide.

Plate-like filler: talc, mica, glass flakes, synthetic hydrotalcite.

Needle-like filler: wallastonite, potassium titanate, basic magnesium sulfate (moth Heidi), sepiolite, zonotolite, aluminum borate.

Spherical filler: bead, balloon

With a view to imparting various functions, the following functional fillers may be added. Functional fillers: metallic electroconductive fillers, non-metallic electroconductive fillers, carbon based electroconductive fillers, magnetic fillers, piezoelectric/pyroelectric fillers, sliding (lubricating/anti-abrasive) fillers, sealing fillers, ultraviolet absorbing fillers, damping fillers, anti-blocking fillers, flame retardants, and so forth.

Further, the fillers may be treated with a coupling agent, surface treating agent or the like in order to increase the dispersibility together with the degradable polymer. The coupling agent or surface treating agent that can be used in the present invention includes various coupling agents and surface treating agents such as silane based, titanate based, aluminate based, carboxylic acid based, phosphorus acid based, fatty acid based, oil and fats, nonionic surfactants, waxes and so forth.

Further, glass fiber, paper (inclusive of salvage), cloth, pulp, wood meal, sawdust, bean curd lees, as well as metal powders such as iron powder may be used.

To accelerate the degradation of the degradable polymer, palm fruit husk fiber, paper (including salvage), cloth, pulp and so forth may be blended.

Further, when a degradable polymer having a high water absorption is used, a filler having a low water absorption, for example glass fiber, talc, clay, mica, metal powder or the like may be added to adjust the water absorption.

Furthermore, the inventive member may optionally contain other resin components as well as the degradable polymer as necessary in order to increase the moldability, moisture seal, rigidity and heat resistance. The other resin components may include, for example, ethylene/butene-1 copolymer resins, propylene/butene-1 copolymer resins, ethylene/propylene/butene-1 copolymer resins, polybutene-1 resins, styrene resins, polymethyl methacrylate resins, styrene/acrylonitrile copolymer resins, ABS resins, polypropylene resins, crystalline propylene/α-olefin copolymer resins, modified polypropylene resins, modified polyethylene resins, polypropylene/maleic anhydride graft copolymer resins, chlorinated polyolefin resins (mainly composed of chlorinated polyethylene resins), ethylene based ionomer resins (metal crosslinked ethylene/unsaturated acid copolymer resins), polymethylpentene resins, vinyl chloride/propylene copolymer resins, ethylene/vinyl alcohol copolymer resins, crosslinked polyethylene resins (electron-beam irradiation crosslinked, chemically crosslinked, etc.), polyisobutylene resins, ethylene/vinyl chloride copolymer resins, 1,2-polybutadiene resins, L-LDPE resins, MDPE resins, EEA resins, EVA resins, propylene/ethylene copolymer resins and so forth.

In the present invention, the degradable polymers and various additives as well as other resin components are selected such that they alone or combinations thereof do not generate substances that give harmful effects on photographic sensitive materials or do not give adverse effects on the photographic sensitive material. The substance that gives adverse effects on the photographic sensitive material includes, for example, hydrogen cyanide, nitrile group-containing gases, hydrogen sulfide and so forth. These substances are causes for fogging or deterioration of the storage stability of the photographic sensitive material. In the present invention, the phraseology "generating no substance that gives harmful effects on a photographic sensitive material" means generating no substance that is harmful to a photographic sensitive material in an amount of, for example, about 0.05 μg or more per g of polymer in spite of the moisture conditioning with heating carried out at 40° C. and at 60% RH for 7 days.

Molding materials containing the degradable polymers and various additives as well as other resin components may be formulated by optionally selecting combinations of components to be used, proportions of components, and so forth depending on various characteristics of molded articles, melt viscosity, fluidity or molding conditions required for at the time of injection molding.

Upon manufacturing the inventive members, it is desirable to carry out injection molding using a hot runner type mold because of releasing no waste upon manufacture, which is advantageous for environmental protection.

The conditions of injection molding may be optionally selected depending on the degradable polymer, additives, and other resin components to be used, the shape of the member, and so forth.

The shape of the inventive member may be optionally determined depending on the photographic sensitive material to be housed or wrapped, and necessary functions and is not particularly limited.

In the case where the inventive member is used in combination with another member, it is preferred that another member is also constituted by the above-mentioned degradable polymer in order to provide wrapping that is friendly to the environment. For example, when the inventive member is the body of a container used for a photographic film cartridge made of a degradable polymer, a wrapping that is friendly to the environment can be provided by constructing the cap of the container from a degradable polymer accordingly.

Further, the shape of the container used for a photographic sensitive material of the present invention is not particularly limited. For example, the shape of the cap of container is not particularly limited as far as the cap in combination with the body of a container can house a container used for a photographic sensitive material. However, it is desirable that the cap can exhibit sufficient sealed engagement together with the body of a container and allows its easy attachment and detachment to and from the body of a container.

EXAMPLES

Hereinafter, the present invention will be explained in concretely by examples and comparative examples. However, the present invention should not be construed as being limited thereto.

Example 1

Using cellulose acetate (CELL GREEN PCA00, manufactured by Daicel Chemical Industries, Ltd.) as a molding material, a body of a container used for a photographic film cartridge as disclosed in JP 11-38558 A, an instant film pack (case body) as disclosed in JP 10-288810 A, and a spool used for a photographic film as disclosed in JP 6-266054 A were molded on an injection molding machine (SG150, trade name, manufactured by Sumitomo Heavy Industries, Ltd.) under the conditions of the cylinder temperature and mold temperature shown in Table 1 and a clamp pressure of 150 t with a hot runner type mold having two cavities.

The water absorption, flexural modulus and impact strength of cellulose acetate used as the molding material were measured according to the methods set forth below. Further, the body of a container used for a photographic film cartridge was subjected to measurements of moisture permeability and engagement strength as well as to drop test according to the methods set forth below. Overall evaluation results are shown in Table 2. For the instant film pack, evaluation results of photographic properties, of deformation upon molding and of drop test as well as overall evaluation results are shown in Table 3. For the spool used for a photographic film, evaluation or measurements of photographic properties and film loading capability as well as drop test were performed according to the method set forth below and overall evaluation was performed. The results obtained are shown in Table 4.

Water Absorption

This was measured according to A method disclosed in the JIS K7209.

Moisture Permeability

After charging 4 g of calcium chloride in the body of a container used for a photographic film cartridge, the LDEP-made cap of a container disclosed in JP 11-38558 A was engaged to seal the container, which was left to stand for 24 hours in a thermo-hygrostat chamber conditioned at 40° C. and at 90% RH. After the standing, an increase in weight due to moisture absorption was measured using a precision weighing machine. The increase in weight was defined as moisture permeability.

Flexural Modulus

This was measured according to JIS K7203.

Engagement Strength

An LDPE-made cap of a container having the shape as disclosed in JP 11-38558 A was engaged with the body of a container used for a photographic film cartridge, and the cap of a container was attached to a jig, which in turn was attached to the tip of a spring balance. The spring balance was lifted vertically to pull the cap of the container to measure a force necessary for disengaging the cap from the body of the container. The force measured was defined as an index of engagement strength.

In this measurement, an LDPE-made cap of a container was used. However, it is preferable to use a cap of a container made of a biodegradable resin because it is friendly to the environment.

Impact Strength

Notched impact strength was measured according to JIS K7110.

Photographic Properties

In a metal can having an inner volume of 700 ml were charged 120 g of pellets of a molding material, an ISO 400 color negative film for advanced photo system for 40 shots (NEXIA H, trade name, manufactured by Fuji Photo Film Co., Ltd.) and an instant film (INSTAX Mini, trade name, manufactured by Fuji Photo Film Co., Ltd.). The metal can was sealed in 50° C. and after 3 days, the contents were taken out. The films were used for taking a picture and fog, sensitivity and maximum density were measured and compared with those obtained using an instant film type treated in the same manner as above except that no pellet of a molding material was enclosed together with the film. Evaluation was made according to the following criteria.

○: The photographic properties of the sample were equivalent or superior to those of the type.

×: The photographic properties of the sample were inferior to those of the type.

Capability of Loading Film to Spool

It was tried to load the above-mentioned color negative film for advanced photo system in a film cartridge using a film loader (REATOUCHER AT100, trade name, manufactured by Fuji Photo Film Co. Ltd.) and whether or not loading of the film was possible. In the case where the film was successfully loaded, further tests were performed as to whether or not winding of the film along its whole length and whether or not it was possible to successfully pull out along its whole length. Evaluation was made according to the following criteria.

○: Loading of a film was possible and the winding and pulling out the film along its whole length was also possible.

×: Loading of a film was impossible, or loading of a film was possible but the winding of the film along its whole length was impossible.

Drop Test

Body of a Container Used for a Photographic Film Cartridge

A 36-shot film was charged in a container and the cap of a container was fitted to the body of the container. Then, the body of the container was dropped from a height of 1.5 m. Fifty (50) containers were tested in this way and occurrences of breaking and cracking were examined.

○: No breaking nor cracking.

×: Breaking, cracking, or disengagement of the cap occurred.

Body of Instant Film Pack

Fifty (50) packs each packed with 10 films were dropped from a height of 1.5 m and occurrences of breaking and cracking were examined.

○: No breaking nor cracking.

×: Breaking or cracking occurred.

Spool Used for a Photographic Film

A molded spool used for a photographic film was incorporated in a cartridge and a 40-shot photographic film was wound around the spool to load the film. Fifty (50) cartridges thus obtained were dropped from a height of 1.5 m. Examination was made as to whether or not it was possible to repeat the pulling out and rewinding of the film along its whole length 300 times for each cartridge. Evaluation was made according to the following criteria.

○: After the dropping, it was possible to repeat the pulling out and rewinding of the film along its whole length 300 times ×: After the dropping, it was impossible to repeat the pulling out and rewinding of the film along its whole length 300 times.

Evaluation of Biodegradability

A specimen for tensile test was molded and the surface of the molded article was observed. Then, this was buried in the soil of a garden spot. After 118 days, the surface of the molded article was observed. Evaluation was made according to the following criteria.

○: Cracks, drops or the like state was observed on the surface of the molded article.

×: No change was observed on the surface of the molded article.

Criteria of Overall Evaluation

Overall evaluation of the members used for a container used for a photographic sensitive material on various properties was made based on the criteria set forth below. The evaluation included moisture permeability, engagement strength, photographic properties, presence or absence of occurrence of deformation upon molding, drop test, test of loading a film to a spool, and presence or absence of biodegradability (whether or not to cause environmental problems).

○: Excellent as a member used for a container used for a photographic sensitive material.

X: Unsuitable as a member used for a container used for a photographic sensitive material.

Example 2

An instant film pack (case body) as disclosed in JP 10-288810 A, and a spool used for a photographic film as disclosed in JP 6-266054 A were molded under the conditions of the cylinder temperature and mold temperature shown in Table 1 and a clamp pressure of 150 t with a hot runner type mold having two cavities in the same manner as in Example 1 except that in place of the cellulose acetate as the molding material, use was made of a resin consisting of a mixture of 80% by weight of a high density polyethylene (IDEMITSU POLYETHYLENE 100J, trade name, manufactured by Idemitsu Petro-Chemical Co.) and 20% by weight of DEGRA NOVON (1x1025), manufactured by Novon Japan Co., Ltd.

The water absorption, flexural modulus and impact strength were measured according to the method as described above. Further, the body of a container used for a photographic film cartridge was subjected to measurements of moisture permeability and engagement strength as well as to drop test according to the methods as described above. Overall evaluation results are shown in Table 2. For the instant film pack, evaluation results of photographic properties, of deformation upon molding and of drop test as well as overall evaluation results are shown in Table 3. For the spool used for a photographic film, evaluation or measurements of photographic properties and film loading capability as well as drop test were performed according to the method as described above and overall evaluation was performed. The results obtained are shown in Table 4.

Example 3

An instant film pack (case body) as disclosed in JP 10-288810 A, and a spool used for a photographic film as disclosed in JP 6-266054 A were molded with a hot runner type mold having two cavities in the same manner as in Example 1 except that in place of the cellulose acetate as the molding material use was made of polyhydroxybutyrate/valerate (BIOPOL D411G, manufactured by Nippon Monsanto Co., Ltd.) alone.

The water absorption, flexural modulus and impact strength were measured according to the method as described above. Further, the body of container used for a photographic film cartridge was subjected to measurements of moisture permeability and engagement strength as well as to drop test according to the methods as described above. Overall evaluation results are shown in Table 2. For the instant film pack, evaluation results of photographic properties, of deformation upon molding and of drop test as well as overall evaluation results are shown in Table 3. For the spool used for a photographic film, evaluation or measurements of photographic properties and film loading capability as well as drop test were performed according to the method set forth below and overall evaluation was performed. The results obtained are shown in Table 4.

Example 4

An instant film pack (case body) as disclosed in JP 10-288810 A, and a spool used for a photographic film as disclosed in JP 6-266054 A were molded with a hot runner type mold having two cavities in the same manner as in Example 1 except that in place of the cellulose acetate as the molding material, use was made of polylactic acid (LACTY 9050, manufactured by Shimadzu Corporation) alone.

The water absorption, flexural modulus and impact strength were measured according to the method as described above. Further, the body of a container used for a photographic film cartridge was subjected to measurements of moisture permeability and engagement strength as well as to drop test according to the methods as described above. Overall evaluation results are shown in Table 2. For the instant film pack, evaluation results of photographic properties, of deformation upon molding and of drop test as well as overall evaluation results are shown in Table 3. For the spool used for a photographic film, evaluation or measurements of photographic properties and film loading capability as well as drop test were performed according to the method as described above and overall evaluation was performed. The results obtained are shown in Table 4.

Comparative Example 1

An instant film pack (case body) as disclosed in JP 10-288810 A, and a spool used for a photographic film as disclosed in JP 6-266054 A were molded with a hot runner type mold having two cavities in the same manner as in Example 1 except that as the molding material, use was made of a resin consisting of a mixture of 80% by weight of an amide based elastomer (PAPEX 5512MN01) manufactured by Toray Industries, Inc. and 20% by weight of DEGRA NOVON (1x1025), manufactured by Novon Japan Co., Ltd.

The water absorption, flexural modulus and impact strength were measured according to the method as described above. Further, the body of a container used for a photographic film cartridge was subjected to measurements of moisture permeability and engagement strength as well as to drop test according to the methods as described above. Overall evaluation results are shown in Table 2. For the instant film pack, evaluation results of photographic properties, of deformation upon molding and of drop test as well as overall evaluation results are shown in Table 3. For the spool used for a photographic film, evaluation or measurements of photographic properties and film loading capability as well as drop test were performed according to the method as described above and overall evaluation was performed. The results obtained are shown in Table 4.

Comparative Example 2

An instant film pack (case body) as disclosed in JP 10-288810 A, and a spool used for a photographic film as disclosed in JP 6-266054 A were molded with a hot runner type mold having two cavities in the same manner as in Example 1 except that as the molding material, use was made of a resin consisting of a mixture of 80% by weight of a polystyrene (STYRON 679, manufactured by A & M Styrene Co., Ltd.) and 20% by weight of DEGRA NOVON (1x1025), manufactured by Novon Japan Co., Ltd.

The water absorption, flexural modulus and impact strength were measured according to the method as described above. Further, the body of a container used for a photographic film cartridge was subjected to measurements of moisture permeability and engagement strength as well as to drop test according to the methods as described above. Overall evaluation results are shown in Table 2. For the instant film pack, evaluation results of photographic properties, of deformation upon molding and of drop test as well as overall evaluation results are shown in Table 3. For the spool used for a photographic film, evaluation or measurements of photographic properties and film loading capability as well as drop test were performed according to the method as described above and overall evaluation was performed. The results obtained are shown in Table 4.

Comparative Example 3

An instant film pack (case body) as disclosed in JP 10-288810 A, and a spool used for a photographic film as disclosed in JP 6-266054 A were molded with a hot runner type mold having two cavities in the same manner as in Example 1 except that as the molding material, use was made of a resin consisting of a mixture of 80% by weight of a polyamide (DURETHANE BC303), manufactured by Bayer Aktiengesellschaft and 20% by weight of DEGRA NOVON (1x1025), manufactured by Novon Japan Co., Ltd.

The water absorption, flexural modulus and impact strength were measured according to the method as described above. Further, the body of a container used for a photographic film cartridge was subjected to measurements of moisture permeability and engagement strength as well as to drop test according to the methods as described above. Overall evaluation results are shown in Table 2. For the instant film pack, evaluation results of photographic properties, of deformation upon molding and of drop test as well as overall evaluation results are shown in Table 3. For the spool used for a photographic film, evaluation or measurements of photographic properties and film loading capability as well as drop test were performed according to the method as described above and overall evaluation was performed. The results obtained are shown in Table 4.

TABLE 1

| | (Molding Conditions) | |
|---|---|---|
| | Cylinder Temperature (° C.) | Mold Temperature (° C.) |
| Example 1 | 270 | 50 |
| Example 2 | 200 | 40 |

TABLE 1-continued

| | (Molding Conditions) | |
|---|---|---|
| | Cylinder Temperature (° C.) | Mold Temperature (° C.) |
| Example 3 | 180 | 60 |
| Example 4 | 240 | 40 |
| Comparative Example 1 | 230 | 40 |
| Comparative Example 2 | 250 | 50 |
| Comparative Example 3 | 240 | 40 |

TABLE 2

(Body of Container used for Photographic Film Cartridge)

| | Water Absorption (%) | Moisture Permeability (mg/day) | Flexural Modulus (kgf/cm$^2$) | Engagement Strength (kg) | Impact Strength (kgf/cm$^2$) | Drop Test | Bio-degradability | Overall Evaluation |
|---|---|---|---|---|---|---|---|---|
| Example 1 | 5.08 | 4.8 | 12900 | 0.9 | 4.6 | ○ | ○ | ○ |
| Example 2 | 0.05 | 3.5 | 8100 | 0.6 | 1.0 | ○ | ○ | ○ |
| Example 3 | 0.22 | 3.1 | 8870 | 0.7 | 1.9 | ○ | ○ | ○ |
| Example 4 | 0.35 | 2.6 | 26900 | 2.0 | 1.3 | ○ | ○ | ○ |
| Comparative Example 1 | 6.21 | 6.4 | 2200 | 0.2 | NB | x | x | x |
| Comparative Example 2 | 0.03 | 2.0 | 32100 | 2.2 | 0.7 | x | x | x |
| Comparative Example 3 | 7.01 | 6.6 | 16200 | 1.2 | NB | ○ | x | x |

TABLE 3

(Body of Instant Film Pack)

| | Water Absorption (%) | Photographic Properties | Flexural Modulus (kgf/cm$^2$) | Projection of Molded Article | Impact Strength (kg/cm · cm) | Drop Test | Bio-degradability | Overall Evaluation |
|---|---|---|---|---|---|---|---|---|
| Example 1 | 5.08 | ○ | 12900 | No | 4.6 | ○ | ○ | ○ |
| Example 2 | 0.05 | ○ | 8100 | No | 1.0 | ○ | ○ | ○ |
| Example 3 | 0.22 | ○ | 8870 | No | 1.9 | ○ | ○ | ○ |
| Example 4 | 6.35 | ○ | 26900 | No | 1.3 | ○ | ○ | ○ |
| Comparative Example 1 | 6.21 | x | 2200 | Yes | NB | Impossible to test* | x | x |
| Comparative Example 2 | 0.03 | ○ | 32100 | No | 0.7 | x | x | x |
| Comparative Example 3 | 7.01 | x | 16200 | No | NB | ○ | x | x |

Note:
*Impossible to test: Deformation of the molded article was too large to load the film and the test was impossible to perform.

TABLE 4

(Spool used for Photographic Film)

| | Water Absorption (%) | Photographic Properties | Flexural Modulus (kgf/cm$^2$) | Film Loading Capability | Impact Strength (kg/cm · cm) | Drop Test | Bio-degradability | Overall Evaluation |
|---|---|---|---|---|---|---|---|---|
| Example 1 | 5.08 | ○ | 12900 | ○ | 4.6 | ○ | ○ | ○ |
| Example 2 | 0.05 | ○ | 8100 | ○ | 1.0 | ○ | ○ | ○ |
| Example 3 | 0.22 | ○ | 8870 | ○ | 1.9 | ○ | ○ | ○ |
| Example 4 | 0.35 | ○ | 26900 | ○ | 1.3 | ○ | ○ | ○ |
| Comparative Example 1 | 6.21 | x | 2200 | x | NB | Impossible to test* | x | x |
| Comparative Example 2 | 0.03 | ○ | 32100 | ○ | 0.7 | x | x | x |

TABLE 4-continued (Spool used for Photographic Film)

| | Water Absorption (%) | Photographic Properties | Flexural Modulus (kgf/cm²) | Film Loading Capability | Impact Strength (kg/cm · cm) | Drop Test | Bio-degradability | Overall Evaluation |
|---|---|---|---|---|---|---|---|---|
| Comparative Example 3 | 7.01 | x | 16200 | ○ | NB | ○ | x | x |

Note:
*Impossible to test: The film could not be loaded and the test was impossible to perform.

Example 5

Figure 1:
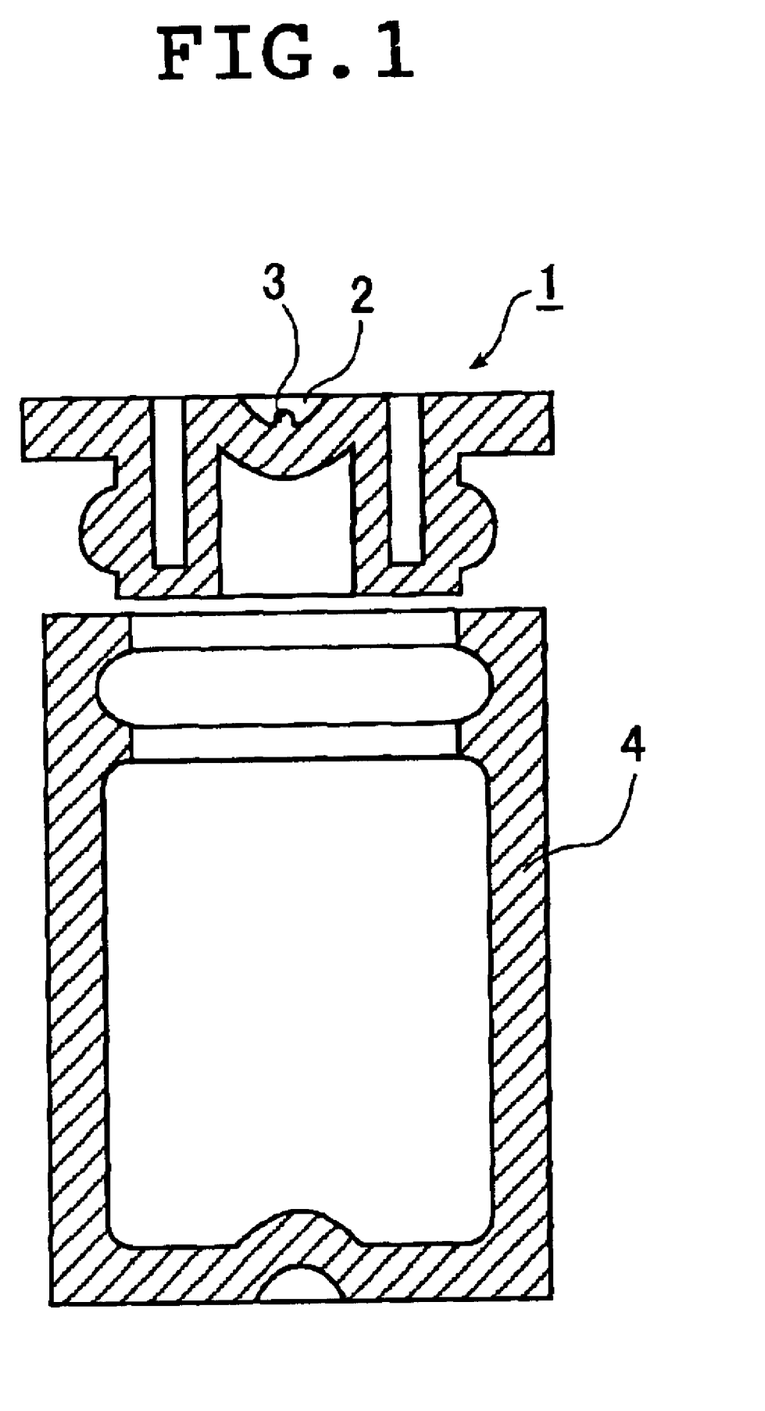
FIG. 1 is a cross-sectional view illustrating the structure of a cap of a container used for a photographic sensitive material molded according to an example of the present invention or comparative example and a body of the container. In the drawing, the reference numerals designate the following parts.

Using cellulose acetate (CELL GREEN PCA00, manufactured by Daicel Chemical Industries, Ltd.) as a molding material, a cap of a container used for a photographic sensitive material 1 as shown in FIG. 1 was injection molded on an injection molding machine (SG150, trade name, manufactured by Sumitomo Heavy Industries, Ltd.) under the conditions of the cylinder temperature and mold temperature shown in Table 5 and a clamp pressure of 150 t with a hot runner type mold having 24 cavities. The cap of a container used for a photographic sensitive material 1 shown in FIG. 1 has a construction such that it has a recess 2 on the upper surface thereof and the recess 2 is provided with a gate 3 molded with the hot runner type mold in the center thereof.

The water absorption and flexural modulus of cellulose acetate used as the molding material were measured in the same manner as in Example 1. Further, the cap of a container used for a photographic sensitive material was subjected to measurements of moisture permeability and engagement strength according to the following methods. Overall evaluation results are shown in Table 6.

Moisture Permeability

After charging 4 g of calcium chloride in a body of a container 4 shown in FIG. 1, the cap of the container 1 was engaged to seal the container, which was left to stand for 24 hours in a thermo-hygrostat chamber conditioned at 40° C. and at 90% RH. After the standing, an increase in weight due to moisture absorption by calcium chloride was measured using a precision weighing machine. The increase in weight was defined as moisture permeability.

Engagement Strength

A part for clamping a cap of a container was attached to the tip of a spring balance and the cap of the container was clamped by the part. Then, the spring balance was lifted upright to pull the cap of the container and a force necessary for disengaging the cap from the body of the container was measured. The measured force was defined as an index of engagement strength.

Overall Evaluation

Evaluation was made of the properties of each material with reference to optimum values of moisture permeability and engagement strength required of for a cap of a container used for a photographic sensitive material and, in addition, the possibility of causing environmental problems based on the following criteria.

○: Excellent as a cap of a container used for a photographic sensitive material.

Δ: Usable as a cap of a container used for a photographic sensitive material.

x: Unsuitable as a cap of a container used for a photographic sensitive material.

Example 6

A cap of a container used for a photographic sensitive material was produced in the same manner as in Example 5 except that polycaprolactone (CELL GREEN P-HB05 manufactured by Daicel Chemical Industries, Ltd.) was used as the molding material. The water absorption and flexural modulus of the molding material and the moisture permeation, engagement strength and degradability of the obtained cap of a container were measured or evaluated according to the methods described above, and overall evaluation was made. The results obtained are shown in Table 6.

Example 7

A cap of a container used for a photographic sensitive material was produced in the same manner as in Example 1 except that a resin consisting of a mixture of 80% by weight of a low density polyethylene (UBE POLYETHYLENE Z470, manufactured by Ube Industries, Ltd.) and 20% by weight of DEGRA NOVON (1X1025), manufactured by Novon Japan Co., Ltd. was used as the molding material. The water absorption and flexural modulus of the molding material and the moisture permeation, engagement strength and degradability of the obtained cap of a container were measured or evaluated according to the methods described above, and overall evaluation was made. The results obtained are shown in Table 6.

Example 8

A cap of a container used for a photographic sensitive material was produced in the same manner as in Example 5 except that a resin consisting of a mixture of 80% by weight of a low-density polyethylene (UBE POLYETHYLENE J5019, manufactured by Ube Industries, Ltd.) and 20% by weight of DEGRA NOVON (1X1025), manufactured by Novon Japan Co., Ltd. was used as the molding material. The water absorption and flexural modulus of the molding material and the moisture permeation, engagement strength and degradability of the obtained cap of a container were measured or evaluated according to the methods described above, and overall evaluation was made. The results obtained are shown in Table 6.

Example 9

A cap of a container used for a photographic sensitive material was produced in the same manner as in Example 5 except that a resin consisting of a mixture of 50% by weight of cellulose acetate (CELL GREEN PCA00, manufactured by Daicel Chemical Industries, Ltd.) and 50% by weight of an amide based elastomer (PAPEX 5512MN01) manufactured by Toray Industries, Inc. was used as the molding material. The water absorption and flexural modulus of the molding material and the moisture permeation, engagement strength and degradability of the obtained cap of a container were measured or evaluated according to the methods described above, and overall evaluation was made. The results obtained are shown in Table 6.

Comparative Example 4

A cap of a container used for a photographic sensitive material was produced in the same manner as in Example 5 except that a low-density polyethylene (UBE POLYETHYLENE Z470, manufactured by Ube Industries, Ltd.) was used as the molding material. The water absorption and flexural modulus of the molding material and the moisture permeation, engagement strength and degradability of the obtained cap of a container were measured or evaluated according to the methods described above, and overall evaluation was made. The results obtained are shown in Table 6.

Comparative Example 5

A cap of a container used for a photographic sensitive material was produced in the same manner as in Example 5 except that a resin consisting of a mixture of 80% by weight of an amide based elastomer (PAPEX 5512MN01) manufactured by Toray Industries, Inc. and 20% by weight of DEGRA NOVON (1X1025), manufactured by Novon Japan Co., Ltd. was used as the molding material. The water absorption and flexural modulus of the molding material and the moisture permeation, engagement strength and degradability of the obtained cap of a container were measured or evaluated according to the methods described above, and overall evaluation was made. The results obtained are shown in Table 6.

Comparative Example 6

A cap of a container used for a photographic sensitive material was produced in the same manner as in Example 5 except that a resin consisting of a mixture of 80% by weight of linear low density polyethylene (JMA01N) manufactured by Nippon Polyolefin Co., Ltd. and 20% by weight of DEGRA NOVON (1X1025), manufactured by Novon Japan Co., Ltd. was used as the molding material. The water absorption and flexural modulus of the molding material and the moisture permeation, engagement strength and degradability of the obtained cap of a container were measured or evaluated according to the methods described above, and overall evaluation was made. The results obtained are shown in Table 6.

TABLE 5

|  | Cylinder Temperature (° C.) | Mold Temperature (° C.) |
|---|---|---|
| Example 5 | 240 | 50 |
| Example 6 | 200 | 40 |
| Example 7 | 180 | 40 |
| Example 8 | 180 | 40 |
| Example 9 | 220 | 40 |
| Comparative Example 4 | 180 | 40 |
| Comparative Example 5 | 230 | 40 |
| Comparative Example 6 | 170 | 30 |

TABLE 6

|  | Water Absorption (%) | Flexural Modulus (kgf/cm$^2$) | Moisture Permeability (mg/day) | Engagement Strength (kg) | Bio-degradability | Overall Evaluation |
|---|---|---|---|---|---|---|
| Example 5 | 5.08 | 12900 | 4.6 | 3.7 | ○ | Δ |
| Example 6 | 0.58 | 5700 | 2.2 | 2.3 | ○ | ○ |
| Example 7 | 0.06 | 3920 | 3.1 | 1.6 | ○ | ○ |
| Example 8 | 0.06 | 1200 | 4.3 | 0.6 | ○ | ○ |
| Example 9 | 5.90 | 5990 | 4.8 | 2.4 | ○ | ○ |
| Comparative Example 4 | 0.01 | 3980 | 2.1 | 2.0 | x | x |
| Coinparative Example 5 | 6.21 | 2200 | 7.6 | 1.3 | x | x |
| Comparative Example 6 | 0.01 | 900 | 4.7 | 0.4 | ○ | Δ |

INDUSTRIAL APPLICABILITY

The member used for a photographic sensitive material of the present invention does not give adverse effects on the photographic sensitive material, exhibits necessary performance equivalent to or superior to the conventional member. It does not hurt an incinerator upon incineration for scrapping it, and in the nature, it is decomposed or reduced in strength by microbes, light or heat and hence it is free of the danger of causing environmental problems.

Further, a container of a photographic sensitive material, particularly a cap of a container used for a photographic sensitive material, that is the member used for a photographic sensitive material according to the present invention has features of not hurting an incinerator upon incineration for scrapping it, and of being free of the danger of causing environmental problems because in the nature, it is decomposed or reduced in strength by microbes, light or heat. At the same time, it gives no adverse effects on the photographic properties in respect of engagement strength and moisture-proof property so that it can exhibit necessary performance equivalent to or superior to the conventional cap of a container.

What is claimed is:

1. A member used for a photographic sensitive material, wherein the member is molded from a degradable polymer having a water absorption of 6% or less and a flexural modulus of 9,500 to 42,000 kgf/cm$^2$.

2. A member used for a photographic sensitive material according to claim 1, wherein said degradable polymer comprises a polymer which can be decomposed by microbes, light, heat or mixture thereof.

3. A member used for a photographic sensitive material according to claim 1, wherein said degradable polymer contains a stimulant for microbial degradation.

4. A member used for a photographic sensitive material according to claim 1, wherein said degradable polymer has a water absorption of 1% or less.

5. A member used for a photographic sensitive material according to claim 1, wherein said degradable polymer has a notched Izod impact strength at 23° C. of 0.8 kg cm/cm or more.

6. A member used for a photographic sensitive material according to claim 1, wherein said degradable polymer has a Vicat softening point of 50° C. or more.

* * * * *